United States Patent Office 3,176,165
Patented Mar. 30, 1965

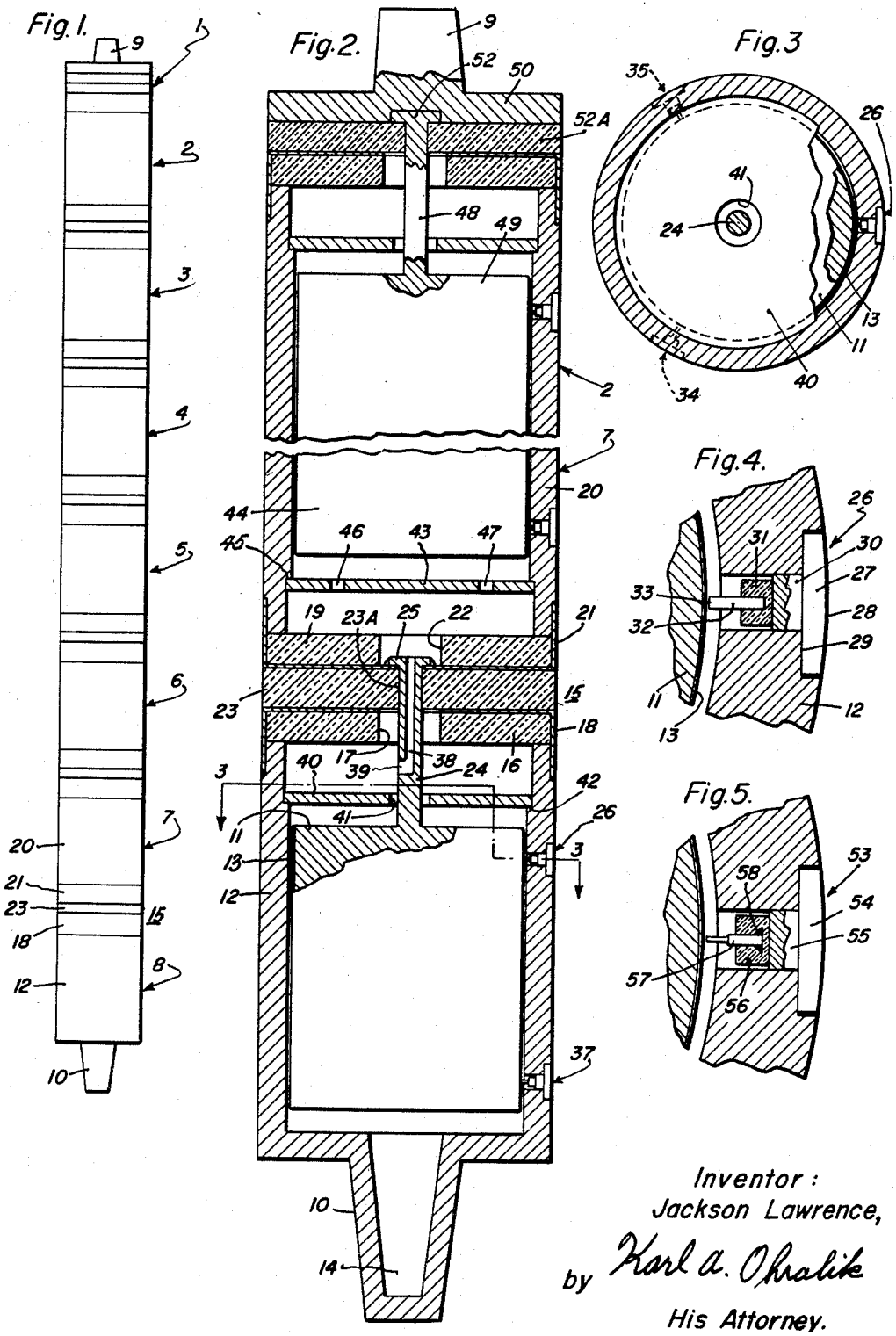

3,176,165
SERIES CONNECTION AND SPACING TECHNIQUES FOR THERMIONIC CONVERTERS
Jackson Lawrence, West Sand Lake, N.Y., assignor to General Electric Company, a corporation of New York
Filed Nov. 15, 1960, Ser. No. 69,414
13 Claims. (Cl. 310—4)

My invention relates generally to a thermionic converter apparatus useful to convert heat energy to electrical energy. More particularly, it relates to a novel structure for enabling the combination of a plurality of thermionic converter units in a series circuit connection and in a single unitary structure.

Thermionic converters as contemplated herein generally include a cathode of relatively high work function and a collector electrode of relatively low work function closely spaced with respect to each other and with the space therebetween evacuated or filled with a suitable gas at low pressure. The cathode is operated at a temperature of copious electron emission and the collector is operated at a considerably lower temperature.

Thermionic converters of present construction are devices of inherently relatively low output potential. There are situations in which thermionic converters would readily adapt as a power source but for such low output potentials. The connection of a plurality of thermionic converters in series circuit arrangement in many cases would provide the desired output potentials.

Thermionic converters of heretofore known constructions are electrically adaptable for series circuit connection to provide a higher output potential but the structures of these devices do not readily adapt to the formation of a compact, regular and even surfaced unit when pluralities are combined. Where space considerations are not critical or important or where the outside surface contour may take any form, this presents no particular problem. In certain cases wherein nuclear fuels are utilized for heating the cathode of a thermionic converter, it is advantageous to utilize a concentric, cylindrical construction of electrodes in individual converter units with the respective cathodes enclosed in and spaced from hollow outer collectors. The cathode in each case is made of material including a nuclear fuel and for controlling the heating of the cathode the intensity of its bombardment by neutrons is controlled. It has been found convenient and practical in exposing the nuclear fuel to neutron bombardment by disposing the nuclear fuel in a suitably apertured matrix of a material including a source of neutrons. In the case of a thermionic converter utilizing a nuclear fuel for heating the cathode as herein described it would therefore be convenient and practical to dispose the entire converter unit within an aperture of a matrix material providing a source of neutrons. In a case of a plurality of thermionic converter units utilizing nuclear fuel for heating the cathode and wherein the units are connected in series for providing a higher output potential, it would be desirable to provide a structure of even and smooth outside contour and which is readily adaptable for insertion into and removal from, an aperture of the matrix material providing a neutron source. In addition to the foregoing, it would be desirable in any combination of series connected thermionic converters to establish convection communication between the interiors of the individual units to facilitate evacuation and gas flow between the converters if they are of the cesium or other gas filled type.

Planar surface thermionic converters wherein the individual electrodes undergo thermal expansion and contraction, may be constructed so as to accommodate these dimensional changes while maintaining the spacing between electrodes under all conditions. In a thermionic converter unit of the present concentric electrode type, however, the thermal expansion and contraction of the electrodes produces different spacing between electrodes as, for example, under operating and non-operating conditions. This is clearly so because the cylindrical cathode electrode, for example, expands radially toward the collector electrode and the expansion of electrodes is non-uniform whereas in the planar converter case the cathode electrode may be constructed so as to expand only in a direction away from the collector electrode. Accordingly, certain additional problems exist in connection with maintaining the proper spacing between concentric, cylindrical electrodes under operating conditions. Also, since it is desirable to have access to the spacing elements which preferably extend radially through the collector electrode from its outer surface, certain problems arise in maintaining this outer surface smooth and regular.

For efficient thermionic converter operation, the electrodes are maintained at elevated temperatures and the cathode is operated at a temperature considerably higher than the collector electrode. In providing a group of series connected converters in a compact unit, therefore, it is important to prevent excessive heat transfer from any cathode electrode to the collector of the next adjacent converter as well as to the collector of the converter in question. Since series circuit connection requires a conductive connection between a cathode of one converter and the collector of the next adjacent converter, the transfer of heat through the conductive connection is added to the heat transferred in other ways and thus, presents additional problems in maintaining electrodes at proper temperatures.

It is accordingly a principal object of my invention to combine a plurality of thermionic converter units in a structure presenting a smooth and uniform outer periphery and connecting the units in series circuit through junctions preventing excessive heat transfer and establishing convection communication between units.

It is another object of my invention to establish spacing between electrodes of a thermionic converter under operation conditions thereof by means presenting a smooth outer surface.

It is still another object of my invention to provide a thermionic converter unit of novel construction adaptable for use with nuclear fuels for heating the electrodes thereof.

It is still another object of my invention to provide a thermionic converter apparatus with spaced, concentric electrode surfaces and novel spacer means, externally accessible, for maintaining the spacing between the electrodes.

The novel features believed characteristic of the invention are set forth in the appended claims. The invention itself, together with further objects and advantages thereof, may best be understood with reference to the drawing in which:

FIGURE 1 is an elevational view of a structure incorporating a plurality of thermionic converter units connected together and which is suitable for insertion into and removal from an aperture of material providing a source of neutrons, FIGURE 2 is an enlarged cross-sectional elevation of the combined structure shown in FIGURE 1 and illustrating the details of the connection establishing a series circuit and convection communication between a pair of thermionic converter units, FIGURE 3 is a view taken along section 3—3 of FIGURE 2 and illustrating the disposition of spacer elements about the periphery of an individual converter, FIGURE 4 is a detailed view showing the position and construction of a single spacer element, and FIGURE 5 is a detailed view showing a modification of the spacer element shown in FIGURE 4.

Referring now more particularly to FIGURE 1 of the drawings, 1 represents in its entirety a thermionic converter structure including a plurality of individual thermionic converter units, 2, 3, 4, 5, 6, 7 and 8 connected in series circuit arrangement and forming a rod shaped structure having an even and regular outer surface. At one end of the structure 1 is a positive output electrode 9 and at the other end thereof is a negative output electrode 10. These electrodes project at reduced radii at the respective ends of the structure and are suitable for making contact with suitable terminal elements of an external circuit.

As shown more clearly in FIGURE 2 of the drawings, each thermionic converter unit includes a cathode electrode as shown at 11 contained within and spaced from a collector electrode 12. The cathode electrode may be formed of any suitable nuclear fuel such as uranium carbide, plutonium carbide, thorium carbide, components of these or others and is coated on the exterior surface thereof with a suitable electron emission enhancing material 13 for providing an electron source at elevated temperatures.

The collector electrode 12 is preferably made of a material having a desirably low work function relative to the work function of the surface 13 of cathode 11 and which further has a desirably low "cross-section" for neutrons since the neutrons are supplied by a source external to the collector and pass through it to the cathode. Materials satisfying these requirements and suitable for collectors are stainless steel, an alloy of columbium and titanium, an alloy of zirconium and tin, or molybdenum or the like. For simplicity in construction, assembly and spacing of the electrodes with respect to each other, the adjacent surfaces thereof are made cylindrical and concentric with respect to each other. The unit 8 is terminated at one end in a reservoir 14 at the interior of collector electrode 10 for providing a container for material such as cesium in its liquid state and which forms in the interior of the electrode 10.

At its other end collector 12 is joined to the next adjacent unit 7 through a junction represented at 15. One element of junction 15 includes a ceramic insulating member 16 which may be a material such as alumina in endwise abutment with collector 12 and having a central aperture 17 therein. This ceramic insulating member is preferably held in abutment with collector 12 by a centrally apertured cup 18 which may be a metal spinning made of nickel and titanium bonded to both the collector 12 and ceramic member 16 along overlapping portions. Suitable metal-to-metal and metal-to-ceramic junctions of known types may be utilized for this purpose.

A similarly disk shaped ceramic insulating member 19 is mounted in abutment with the end of an anode 20 of thermionic converter unit 7 and is rigidly supported in position by another centrally apertured cup 21 overlapping these two members along touching surfaces. The cup 21 is bonded to these members by known metal-to-metal and metal-to-ceramic seals. A central aperture 22 is formed in the disk 19 and is in alignment with the aperture 17 in disk 16. An intermediate ceramic member 23 is disposed between ceramic members 16 and 19 and is soldered with a suitable material such as nickel and titanium to metal cups 18 and 21 extending between these members. Ceramic member 23 is centrally at 23A to accommodate a refractory, conductive, cathode connector member 24 which may be molybdenum, tantalum, tungsten or any other suitable material and which is rigidly connected to one end of cathode 11. The connector 24 fits snugly in the aperture in member 23 and is provided with a flange 25 at the end thereof remote from cathode 11 and electric connection between this extension and collector 20 of converter unit 7 is established through the cup 21 which extends radially inwardly into contact with the head 25. The snug fit of connector 24 in the aperture 23A of member 23 and the connection between head 25 and the cup 21 provides a certain amount of support for the cathode 11.

In the operation of the thermionic converter units according to my invention, for the materials disclosed herein for the respective electrodes, to establish proper relative work functions of electrodes, the cathode is heated to a temperature in the range from approximately 1300° C. to 1800° C. and the collector is heated to a temperature in the range from approximately 400° C. to 700° C. Under these circumstances, the temperature differential between any cathode and the next adjacent collector is of the order of several hundred degrees C. (600° C. to 1400° C.). The novel construction of the connector between cathode of one converter unit and collector of the next adjacent unit and the novel construction of junction between units prevent excesseve heat transfer between these units. The connector is made of low heat conductivity material and is further made relatively long and of small cross-sectional area. For the currents conducted through this member, however, it presents a relatively low electrical resistance.

According to another feature of my invention additional support for the cathode 11 and precise spacing between the collector 12 and cathode 11 under operating conditions of the converter are established by a plurality of spacers such as that shown at 26 in FIGURE 2 and in detail in FIGURE 4 of the drawings. Each spacer comprises a base member 27 with an outer surface 28 having a contour of a right circular cylinder and which is adaptable to fit in a recess 29 in collector member 12 so that the surface 28 and the outer surface of the collector 12 lie in the same right circular cylindrical surface. The base member 27 has formed preferably integral therewith a pedestal 30 of reduced cross-section and mounted on the pedestal at a portion thereof remote from base 27 is a ceramic insulating member 31 in which is embedded a spacer pin 32 of relatively small cross-section. As an alternative, pedestal 30 may be recessed to accommodate member 31 to provide additional support therefor. The pin 32 is thus mounted in insulating relationship with respect to the base 27 and pedstal 30 which is in conductive contact with the collector 12. The position of the tip 33 of pin 32 is precisely determined to be at a location to which the cathode 11 will expand under operating conditions of elevated temperature, due consideration being given to the expansion of anode 12. As shown in FIGURE 4, the gap between this tip 33 and cathode 11 represents a condition other than the final operating condition of the converter at which these two are just in engagement with each other. In the final assembly of the converter, the base 27 of spacer 26 is preferably secured within recess 29 by a suitable solder between these two members.

According to my invention, to establish uniform spacing between the electrodes of the converter, a plurality of three or more spacers is provided about the periphery of each converter at any one axial location and depending upon the size and weight of the respective members these groups of spacers may be provided at two or more axial locations along the converter. A first set of three spacers at one axial location may comprise the three shown at 26, 34 and 35 in FIGURE 3 of the drawings representing a view along section 3—3 of FIGURE 2 and another similar group of spacers are disposed at an axial location shown at 37 in FIGURE 2 of the drawings.

For establishing communication between the interiors of converter units such as 7 and 8, the connector 24 is provided with an axial bore 38 extending from the head 25 thereof toward the cathode 11 and is also provided with a radial aperture 39 extending from the outer surface thereof into communication with the bore 38. In the case of a cesium or other gas filled device the bore 38 and aperture 39 allow the free flow of such gas between the converter units.

As pointed out hereinabove, in the operating condition of the converter the cathode 11 is raised to a relatively high temperature and to minimize the adverse effects of heat upon the junction 15 and to minimize heating of connecter 24 a suitable heat shield as shown at 40 is disposed within collector 12 between one end of the cathode 11 and the junction 15. To accomodate the extension member 24, the heat shield 40 is provided with an aperture 41 centrally thereof which is considerably larger than connector 24. The heat shield may be mounted in any suitable manner as, for example, on an annular shoulder 42 formed in the interior of collector 12 and may be soldered or otherwise secured in position. On the other side of the junction 15 is disposed another heat shield as shown at 43 and which is disposed between a cathode of thermionic converter unit 7 such as shown at 44, and the junction 15 and this heat shield may similarly be secured in position on a shoulder 45 of collector 20 by solder or any other suitable means. The heat shield 43 is provided with apertures such as shown at 46 and 47 to allow convection communication between the interior of the converter on opposite sides of the heat shield.

The construction of each thermionic converter unit of the structure 1 is similar to converter 8 described hereinabove with the exception that at the cathode end of the converter unit 1, the extension 48 of a cathode 49 in thermionic converter unit 2 is made solid because no communication beyond the unit 2 is necessary. A solid, conductive member 50 making direct contact with the head end 52 of this extension is secured to an insulator 52A at the end of the converter 2. The output electrode 9 is preferably made integral with this conductive member 50. The structure of junctions between converter units are similar to junction 15.

In accordance with another embodiment of my invention as shown in FIGURE 5 of the drawings, a spacer such as shown at 53 may be provided which includes a base 54, a pedestal 55 and a ceramic insulating member 56 entirely similar to corresponding base 27, pedestal 30 and ceramic insulating member 31 of the spacer 26 shown in FIGURE 4 of the drawing. In this embodiment of invention the pedestal may again be recessed to accommodate ceramic insulating member 56. In the spacer 53, however, the aperture in ceramic insulating member 56 which accommodates a spacer pin 57 is undercut at 58. In accordance with a feature of this embodiment of my invention, this construction allows for the use of a tungsten spacer pin 57 and because of the mismatch of thermal expansion of tungsten and alumina which may be the materials of pin 57 and ceramic 56, respectively, the undercut region allows the use of a brazing material at the base of pin 57 establishing a rigid support for the pin 57 in the ceramic.

The construction of a thermionic converter system according to my invention allows for significant advantages in manufacture, for example. The ceramic seals such as shown at 15 and the respective electrodes may be separately premanufactured and readily and easily assembled merely by brazing in accordance with well known metal-to-metal and metal-to-ceramic brazes.

In accordance with the foregoing description, it is clear that I have provided a novel and advantageous construction of series connected thermionic converters in a unitary structure having a smooth and even outer surface adaptable for insertion into and removal from an apertured matrix and in which spacing between concentric, circular electrodes is precisely maintained. The novel construction according to my invention further establishes convection communication between separate units of the entire structure for evacuation and gas glow and through junctions preventing excessive heat transfer.

While the present invention has been described by reference to particular embodiments thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. An apparatus for converting heat energy to electrical energy comprising a plurality of converter units each having a cathode electrode enclosed in and spaced from a collector electrode, means for interconnecting the cathode electrodes of one less than the total number of said units to the collector electrode of one other of said units, each collector being connected to only one cathode, means establishing convection communication between said units, each of said units including means for maintaining the spacing between said electrodes and comprising a base member having a pedestal supporting an insulating member and a spacer pin embedded in said insulating member, said base member being disposed in a recess of said anode electrode and the tip of said pin projecting towards said cathode and being in engagement therewith in the operating condition of said converter.

2. A thermionic converter apparatus comprising a cathode electrode adaptable to emit electrons at an elevated temperature and a collector electrode, means for maintaining said cathode uniformly spaced from said collector at elevated temperatures and including a plurality of spacers each having a base member and a pedestal disposed in a recess of said collector, an insulating member mounted on said pedestal and supporting a spaced pin projecting toward said cathode, said base being exteriorly exposed along a surface flush with the outer surface of said collecter electrode.

3. An apparatus for converting heat energy to electrical energy comprising a plurality of converter units each having a cathode electrode including a nuclear fuel and having an outer surface of right circular cylindrical form, a collector electrode enclosing said cathode electrode and having an inner surface of right circular cylindrical form concentric with the right circular cylindrical surface of said cathode and being uniformly spaced therefrom, said cylindrical collector electrode being made of a material having a relatively low neutron cross-section, means interconnecting the cathode of one less than the total number of said units to the collector electrode of another one of said units and including a connector member of refractory conductive material extending from conductive contact with each cathode to means conductively connected with one of said collectors, a bore through a portion of said connector for establishing convection communication between the interiors of said units, means for maintaining the spacing between said cathode and said collector at elevated temperatures and including a plurality of spacing members each having a base with one surface exteriorly exposed and flush with the exterior surface of said collector electrode, a pedestal projecting from said base and an insulating member mounted on said pedestal, a spacer pin embedded in said insulating member and being insulated from said pedestal, said pin projecting toward said cathode and being in contact therewith at the elevated operating temperature thereof and means securely maintaining said base in position.

4. An apparatus for converting heat energy to electrical energy comprising a plurality of cylindrical thermonic converter units each having a cathode electrode enclosed in and spaced radially from a hollow cylindrical collector electrode, junction means mechanically joining said converter units in end to end relation to form a hermetically sealed unit and electrically connecting the cathode of one converter unit with the collector electrode of the adjacent converter unit comprising first electrically conducting means extending inwardly from the hollow collector electrode of said adjacent converter unit and a second conducting means extending longitudinally from the end of the cathode electrode of said one converter unit and connected with said first electrically conducting means and mechanically supporting said cathode electrode of said one converter unit within the surrounding hollow cathode electrode, said second electrically conducting means providing a passageway establishing communication between the interiors of adjacent converter units and means for maintaining the spacing between the cathode and collector of each of said units.

5. An apparatus for converting heat energy to electrical energy comprising a plurality of cylindrical thermionic converter units each having a cathode electrode enclosed in and spaced radially from a hollow cylindrical collector electrode, means for raising the temperature of said cathode electrode to copious electron emission, means mechanically joining adjacent converter units in end to end relation and including means for interconnecting the cathode electrodes of one less than the total number of said units to respective collector electrodes of adjacent ones of said units, each collector being connected to only one cathode, said interconnecting means including a refractory conductive member extending from conductive contact with an end of each cathode and into contact with means conductively joining a collector of an adjacent unit, said interconnecting member having a passage therein establishing communication between adjacent units, and a heat shield extending transversely and interposed between each cathode and the junction between adjacent pairs of units and being provided with an aperture to accommodate the interconnecting member.

6. A spacer for maintaining the spacing between a pair of electrodes at different potentials comprising a base member having a pedestal thereon and an insulating member supported on said pedestal, a refractory pin embedded in said insulating member and being in nonconductive relation with said pedestal, the base of said spacer having a surface contour conforming to the surface contour of one of said electrodes and being receivable in a recess of said electrode to present a flush continuous surface and said pin being engageable with the surface of the other of said electrodes in a spaced condition thereof to maintain the spacing between said electrodes.

7. A spacer for maintaining the spacing between a pair of electrodes operable at different potentials comprising a base member having a pedestal thereon and an insulating member supported on said pedestal, said insulating member having an elongated, concave surface portion enlarged at the end thereof remote from the exterior surface of said base member, a spacer pin insertable into said concave surface portion whereby said enlargement accommodates a suitable solder material producing a bond between said pin and said insulating material.

8. An apparatus for converting heat energy to electrical energy comprising a plurality of thermionic converter units in juxtaposition and having collector electrodes presenting an even, regular outer periphery, each of said units having a cathode electrode enclosed by the collector electrode of the unit and being spaced therefrom, means connecting said units in a series electrical circuit and including conductive members each joining a cathode of one unit to means conductively joining the collector of the next adjacent unit, means for maintaining the interelectrode spacing in each unit and including a plurality of spacers extending through each of said anodes into contact with the cathode contained therein, each spacer having a surface contour conforming to the exterior surface contour of said anode and an insulating member supported on a portion of the spacer remote from said surface, a spacer pin embedded in said insulating member and protruding toward the cathode for engagement therewith in the operating condition of the converter for maintaining the spacing between the electrodes.

9. An apparatus for converting heat energy to electrical energy comprising a pair of cylindrical thermionic converter units and a junction for joining said units in end to end relation, each of said units comprising a cathode electrode and a radially spaced hollow cylindrical collector electrode, said junction including insulating elements disposed between and secured to respective collector electrodes, means interconnecting one of said cathodes to the collector of the adjacent one of said units and including an elongated refractory conductive member extending from conductive contact with said cathode to means conductively connected with said collector electrode, a pair of heat shields, each of said heat shields being disposed between said junction and a cathode adjacent thereto, whereby said cathodes may be operated at elevated temperatures without excessive heat transfer therefrom to said junction.

10. Apparatus for converting heat energy to electrical energy comprising a generally cylindrical structure including a plurality of thermionic converter units electrically connected in series, each of said converter units including a generally cylindrical cathode electrode, a surrounding hollow cylindrical collector electrode in closely spaced relation to the exterior surface of said cathode electrode, means joining said thermionic converter units mechanically together in end to end relation and including electrically conducting means extending from the central portion of the one end of the cathode electrode of one of said converter units to the adjacent end of the collector electrode of the second of said units, said electrical connection having limited cross section to minimize the transfer of heat from the cathode electrode to collector electrode which it electrically connects.

11. Apparatus for converting heat energy to electrical energy comprising a generally cylindrical structure including a plurality of thermionic converter units electrically connected in series, each of said converter units including a generally cylindrical cathode electrode, a surrounding hollow cylindrical collector electrode in closely spaced relation to the exterior surface of said cathode electrode, means joining said thermionic converter units mechanically together in end to end relation and including electrically conducting means extending from the central portion of the one end of the cathode electrode of one of said converter units to the adjacent end of the collector electrode of the second of said units, said electrical connection having limited cross section to minimize the transfer of heat from the cathode electrode to collector electrode which it electrically connects and heat shield means interposed between the cathode electrodes of adjacent converter units and the mechanical junction between said adjacent converter units.

12. Apparatus for converting heat energy to electrical energy comprising a generally cylindrical structure including a plurality of thermionic converter units electrically connected in series, each of said converter units including a generally cylindrical cathode electrode, a surrounding hollow cylindrical collector electrode in closely spaced relation to the exterior surface of said cathode electrode, junction means joining said thermionic converter units mechanically together in end to end relation and including electrically conducting means extending from the central portion of the one end of the cathode electrode of one of said converter units to the adjacent end of the collector electrode of the second of said units, said electrical connection having limited cross section to minimize the transfer of heat from the cathode electrode to collector electrode which it electrically connects and heat shield means interposed between the cathode electrodes of adjacent converter units and the mechanical junction between said adjacent converter units, said converter units each including in the interelectrode space a gaseous medium and means providing a passageway between adjacent converter units through said junction means.

13. A thermionic converter unit comprising a hollow cylindrical collector electrode structure, a cylindrical cathode electrode within said collector electrode, an end wall structure extending across one end of said collector electrode including a disk-like insulator, a rigid conductor extending from the end of said cylindrical cathode through said insulator and providing an electrical terminal and mechanical support for said cathode, and spacing means carried by one of said electrodes for determining the minimum spacing between the opposed surfaces of said cathode and said collector electrodes.

References Cited by the Examiner

UNITED STATES PATENTS

| | | | |
|---|---|---|---|
| 2,517,120 | 8/50 | Linder | 313—1 X |
| 2,581,446 | 1/52 | Robinson. | |
| 2,863,074 | 12/58 | Johnstone | 310—4 |
| 2,887,606 | 5/59 | Diemer et al. | |
| 2,916,649 | 12/59 | Levin. | |

FOREIGN PATENTS

| | | |
|---|---|---|
| 627,049 | 9/27 | France. |
| 797,872 | 7/58 | Great Britain. |

MILTON O. HIRSHFIELD, *Primary Examiner.*